United States Patent
Kim et al.

(10) Patent No.: US 9,741,318 B2
(45) Date of Patent: Aug. 22, 2017

(54) IMAGE DATA ENCODING DEVICE AND METHOD

(71) Applicant: SAMSUNG DISPLAY CO., LTD., Yongin, Gyeonggi-Do (KR)

(72) Inventors: Byung-Hyun Kim, Yongin (KR); Geun-Young Jeong, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 40 days.

(21) Appl. No.: 14/549,483

(22) Filed: Nov. 20, 2014

(65) Prior Publication Data
US 2015/0145878 A1 May 28, 2015

(30) Foreign Application Priority Data

Nov. 22, 2013 (KR) .................. 10-2013-0142653

(51) Int. Cl.
| | |
|---|---|
| H04N 19/176 | (2014.01) |
| H04N 19/50 | (2014.01) |
| G09G 5/39 | (2006.01) |
| G09G 3/20 | (2006.01) |
| H04N 19/46 | (2014.01) |
| H04N 19/12 | (2014.01) |
| H04N 19/136 | (2014.01) |
| H04N 19/186 | (2014.01) |
| G09G 5/393 | (2006.01) |
| G09G 5/395 | (2006.01) |

(52) U.S. Cl.
CPC ............. *G09G 5/39* (2013.01); *G09G 3/20* (2013.01); *H04N 19/12* (2014.11); *H04N 19/136* (2014.11); *H04N 19/176* (2014.11); *H04N 19/186* (2014.11); *H04N 19/46* (2014.11); *G09G 5/393* (2013.01); *G09G 5/395* (2013.01); *G09G 2330/021* (2013.01); *G09G 2340/02* (2013.01); *G09G 2360/18* (2013.01); *H04N 19/50* (2014.11)

(58) Field of Classification Search
None
See application file for complete search history.

(56) References Cited

U.S. PATENT DOCUMENTS

| | | | |
|---|---|---|---|
| 2004/0135908 A1 | 7/2004 | Pappalardo et al. | |
| 2008/0267495 A1* | 10/2008 | Shimura ............. | H04N 19/176 382/166 |
| 2010/0134477 A1* | 6/2010 | Kim ..................... | G09G 3/3406 345/214 |

(Continued)

FOREIGN PATENT DOCUMENTS

| | | |
|---|---|---|
| KR | 10-2012-0052739 A | 5/2012 |
| KR | 10-2013-0093350 A | 8/2013 |

*Primary Examiner* — Bernard Krasnic
(74) *Attorney, Agent, or Firm* — Lewis Roca Rothgerber Christie LLP (57) ABSTRACT

An image data encoding device includes a data block generating unit configured to split image data into a plurality of data blocks, and a compressing unit configured to generate compressed data with respect to each of the plurality of data blocks, the compressed data including position information regarding positions of first pixels each having a gray scale value equal to a reference gray scale value, and difference values between the reference gray scale value and gray scale values of second pixels, which are different from the reference gray scale value.

12 Claims, 5 Drawing Sheets

(56) References Cited

U.S. PATENT DOCUMENTS

| | | | |
|---|---|---|---|
| 2011/0084980 A1* | 4/2011 | Lee | G09G 3/3406 |
| | | | 345/589 |
| 2012/0120043 A1 | 5/2012 | Cho et al. | |
| 2013/0208016 A1 | 8/2013 | Park et al. | |
| 2015/0016501 A1* | 1/2015 | Guo | G06T 9/00 |
| | | | 375/240.02 |

* cited by examiner

DATA: R1 | G1 | B2 | G2 | R3 | G3 | B4 | G4 | R5 | G5 | B6 | G6 | R7 | G7 | B8 | G8

| CD_R | Rpos | Rd1 | Rd2 |
|---|---|---|---|

| CD_B | Bpos | Bd1 | Bd2 |
|---|---|---|---|

| CD_G1 | G1pos | G1d1 | G1d2 |
|---|---|---|---|

| CD_G2 | G2pos | G2d1 | G2d2 |
|---|---|---|---|

IMAGE DATA ENCODING DEVICE AND METHOD

CROSS-REFERENCE TO RELATED APPLICATION

This application claims priority to and the benefit of Korean Patent Application No. 10-2013-0142653, filed on Nov. 22, 2013, in the Korean Intellectual Property Office, the entire contents of which are incorporated herein by reference in their entirety.

BACKGROUND

1. Field

Embodiments of the present invention relate to an image data encoding device and method.

2. Description of the Related Art

Recently, various flat panel display devices capable of reducing weight and volume, which are shortcomings of cathode ray tubes (CRTs), have been developed. Flat panel display devices may include a liquid crystal display (LCD), a field emission display (FED), a plasma display panel (PDP), an organic light emitting diode (OLED) display, and the like.

Pixels of a flat panel display device each include a plurality of subpixels. In general, the plurality of subpixels corresponds to the three primary colors. Namely, each of the plurality of subpixels corresponds to one of a red subpixel, a green subpixel, or a blue subpixel.

Recently, a subpixel arrangement aimed at overcoming limitations in micromachining and at enhancing resolution has been developed. For example, in a pentile RG-BG type display device, a pixel includes a green subpixel, and additionally either a red subpixel or a blue subpixel.

Meanwhile, as resolution of display devices increases, an amount of used data is increased. The increase in the amount of data increases power consumption, and increases a size of required memory.

SUMMARY

An embodiment of the present invention relates to an image data encoding device, and a method capable of increasing a compression rate of image data.

An image data encoding device according to an embodiment of the present invention includes a data block generating unit configured to split image data into a plurality of data blocks, and a compressing unit configured to generate compressed data with respect to each of the plurality of data blocks, the compressed data including position information regarding positions of first pixels each having a gray scale value equal to a reference gray scale value, and difference values between the reference scale value and gray scale values of second pixels, which are different from the reference gray scale value.

The data block generating unit may be configured to generate the plurality of data blocks by splitting the image data for each of pixel groups including continuously arranged pixels.

The data block generating unit may be configured to generate a red data block, a green data block, and a blue data block for each of the pixel groups.

The reference gray scale value may correspond to a last pixel of a previous pixel group of the pixel groups adjacent a current pixel group of the pixel groups.

The data compressing unit may include a compression controller configured to generate a compression control signal when a number of the first pixels is greater than or equal to a reference number, a position information generating unit configured to generate the, position information regarding the positions of the first pixels in response to the compression control signal, and a subtracting unit configured to calculate the difference values between the reference gray scale value and the gray scale values of the second pixels in response to the compression control signal.

The data compressing unit may be configured to compress the plurality of data blocks according to a different compression scheme when a number of the first pixels is smaller than the reference number.

The different compression scheme may include a binary encoding scheme and a differential pulse code modulation (DPCM) scheme.

An image data encoding method according to an embodiment of the present invention includes splitting image data into a plurality of data blocks, determining a number of first pixels having a gray scale value equal to a reference gray scale value for each of the data blocks, generating position information regarding positions of the first pixels when the number of the first pixels is greater than or equal to a reference number, calculating difference values between the reference gray scale value and gray scale values of second pixels, which are different from the reference gray scale value, and generating compressed data including the position information and the difference values.

The splitting the image data may include splitting the image data for pixels groups each including continuously arranged pixels.

The plurality of data blocks may include a red data block, a green data block, and a blue data block in each of the pixel groups.

The reference gray scale value may correspond to a last pixel of a previous pixel group adjacent a current pixel group.

BRIEF DESCRIPTION OF THE DRAWINGS

Example embodiments will now be described more fully hereinafter with reference to the accompanying drawings. However, the embodiments may be embodied in different forms, and should not be construed as strictly limited to the embodiments set forth herein. Rather, the described embodiments are provided so that the present disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can either be the only element between the two elements, or one or more intervening elements may also be present. Like reference numerals refer to like elements throughout.

DETAILED DESCRIPTION

Embodiments of the present invention will be described in detail with reference to the accompanying drawings.

Figure 1:
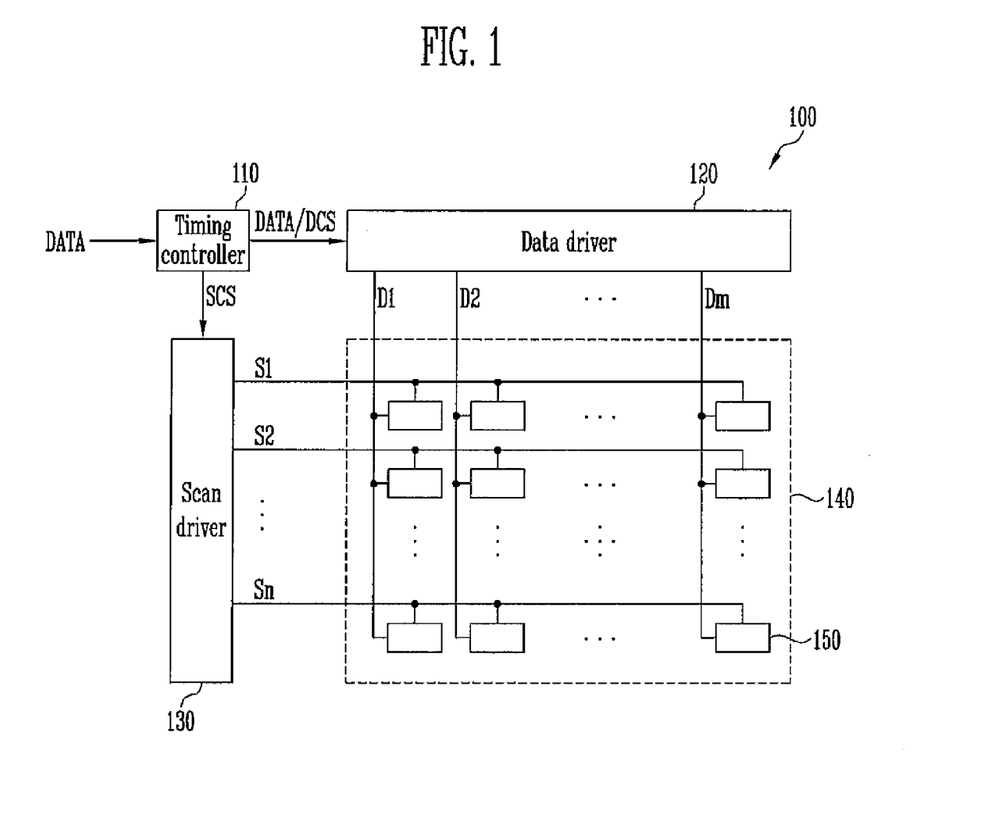
FIG. 1 is a block diagram schematically illustrating a display device according to an embodiment of the present invention.

FIG. 1 is a block diagram schematically illustrating a display device according to an embodiment of the present invention. Referring to FIG. 1, a display device 100 of the present embodiment includes a timing controller 110, a data driver 120, a scan driver 130, and a display unit 140.

The timing controller 110 controls operations of the data driver 130 and the scan driver 130 in response to an externally supplied synchronizing signal. In detail, the timing controller 110 generates a data driving control signal DCS, and supplies the same to the data driver 120. The timing controller 110 generates a scan driving control signal SCS, and supplies the same to the scan driver 130.

Also, the timing controller 110 supplies externally supplied image data DATA, for example, an application processor of a host, to the data driver 130 in synchronization with the data driving control signal DCS and the scan driving control signal SCS. In detail, the timing controller 110 temporarily stores (e.g., buffers) the image data DATA, and subsequently supplies the same to the data driver 130.

Here, types of externally supplied image data DATA are not limited. However, hereinafter, and for the purpose of description, the technical concept of embodiments of the present invention will be described with the assumption that the image data DATA is RG-BG type data (i.e., pentile type data).

A configuration and operation of the timing controller 110 according to an embodiment of the present invention will be described in detail with reference to FIGS. 2 and 3.

In response to the data driving control signal DCS output from the timing controller 110, the data driver 120 realigns the image data DATA supplied from the timing controller 110, and then supplies data signals to data lines D1 to Dm.

In response to the scan driving control signal SCS output from the timing controller 110, the scan driver 130 sequentially supplies scan signals to the scan lines S1 to Sn.

The display unit 140 includes pixels 150 respectively positioned at crossing regions of data lines D1 to Dm and scan lines S1 to Sn. Here, the data lines D1 to Dm are arranged in a vertical direction, and the scan lines S1 to Sn are arranged in a horizontal direction.

Each of the pixels 150 emit light with luminance corresponding to a data signal supplied through a corresponding data line of the data lines D1 to Dm. Each of the pixels 150 includes a plurality of subpixels. For example, each of the pixels 150 may include a red subpixel, a green subpixel, and a blue subpixel.

Figure 2:
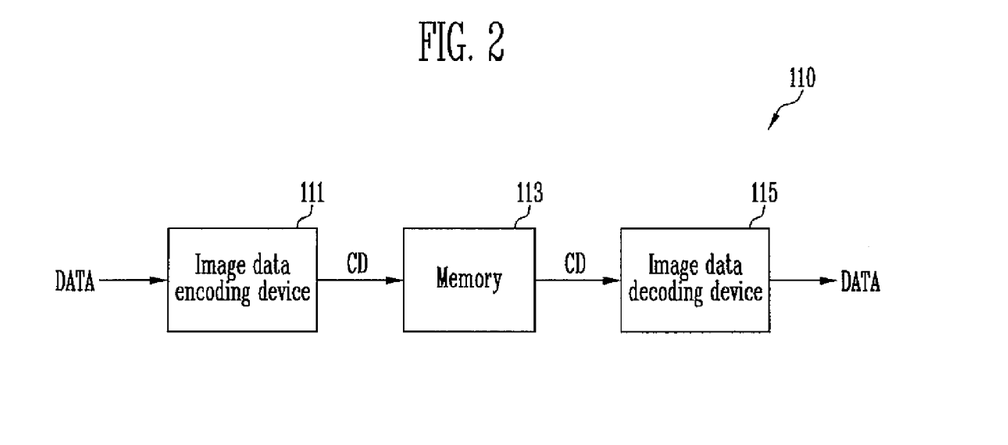
FIG. 2 is a block diagram illustrating a portion of a timing controller illustrated in FIG. 1.
Figure 3:
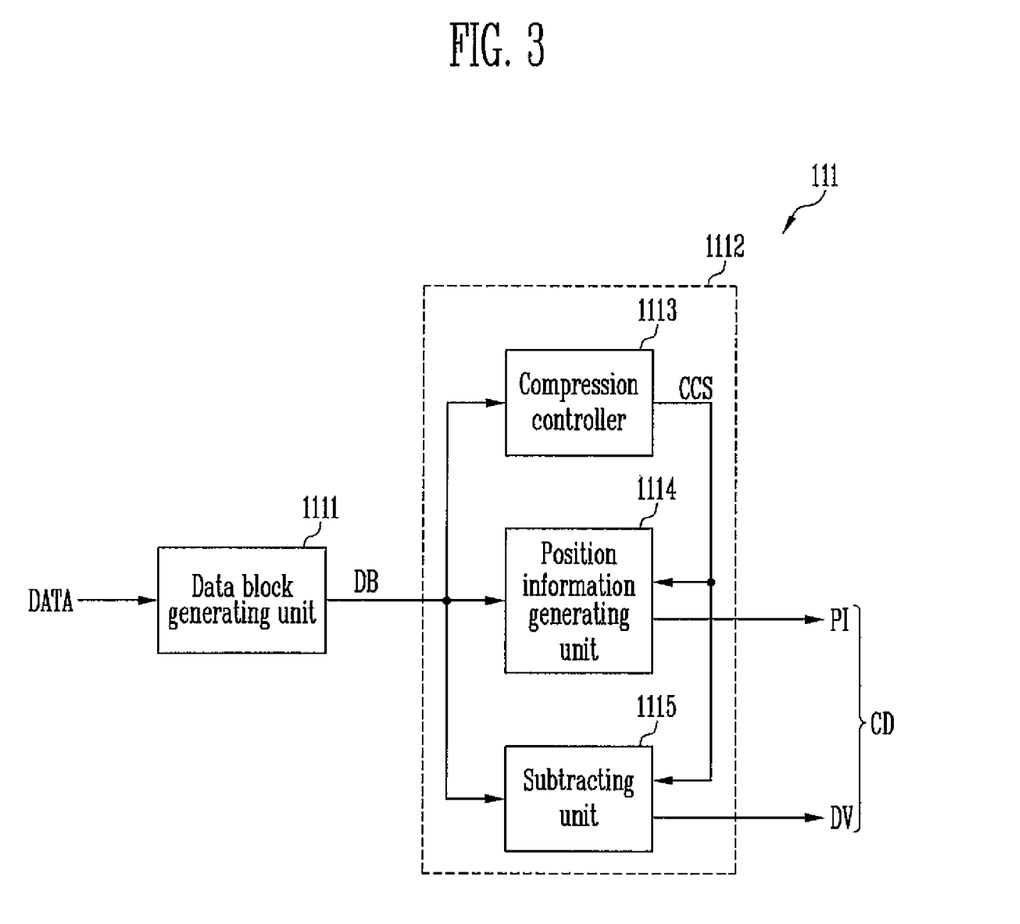
FIG. 3 is a block diagram illustrating an image data encoding device illustrated in FIG. 2.
Figure 4:
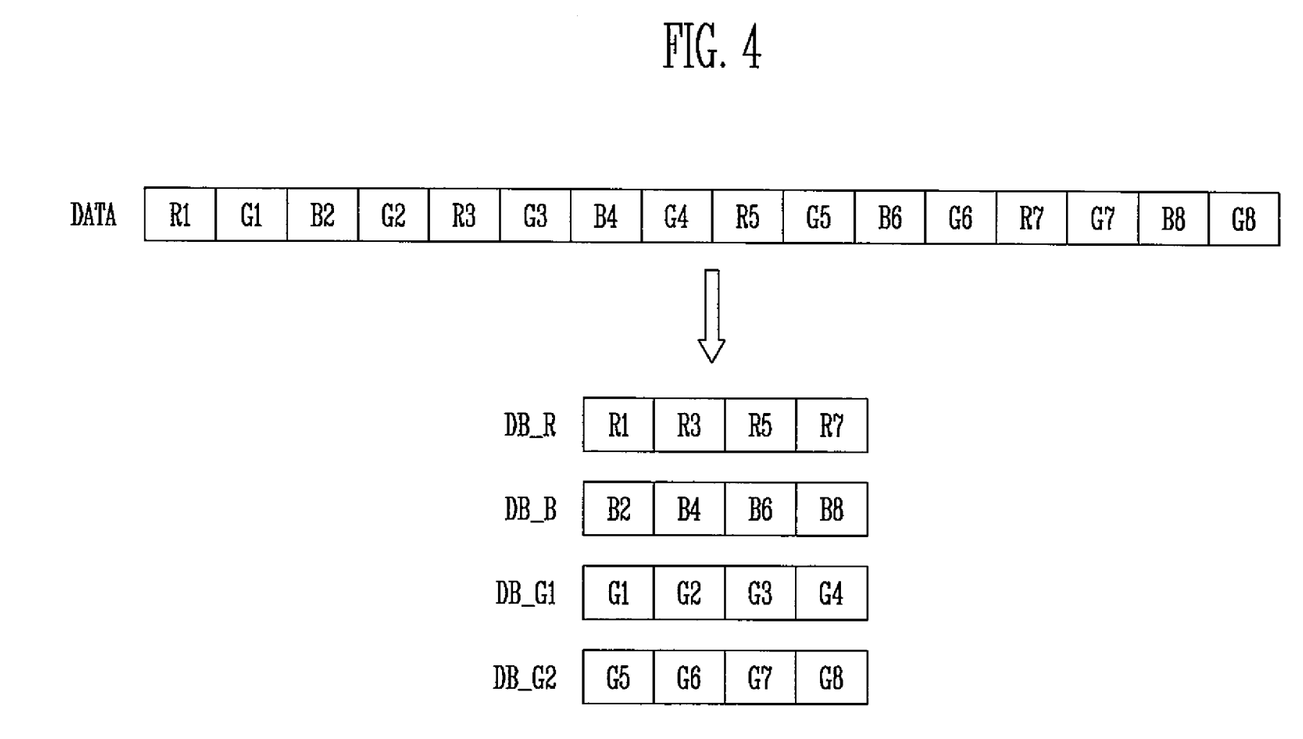
FIG. 4 is a view illustrating a portion of image data and data blocks thereof.
Figure 5:
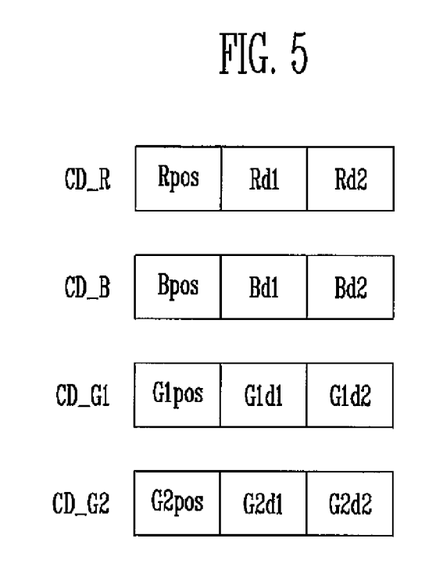
FIG. 5 is a view illustrating data streams of compressed data.

FIG. 2 is a block diagram illustrating a portion of a timing controller illustrated in FIG. 1, FIG. 3 is a block diagram specifically illustrating an image data encoding device illustrated in FIG. 2, FIG. 4 is a view illustrating a portion of image data and data blocks thereof, and FIG. 5 is a view illustrating data streams of compressed data. In FIG. 2, elements for controlling the data driver 120 and the scan driver 130 are omitted for the purpose of description.

Referring to FIG. 2, the timing controller 110 includes an image data encoding device 111, a memory 113, and an image data decoding device 115.

The image data encoding device 111 compresses the image data DATA to generate compressed data CD, and stores the generated compressed data CD in the memory 113. The image data encoding device 111 splits the image data DATA into a plurality of data blocks DB, and compresses the plurality of data blocks DB according to relationships between gray scale values included in the plurality of split data blocks DB.

In detail, the image data encoding device 111 splits the image data DATA to generate a plurality of data blocks DB each having a predetermined size. The image data encoding device 111 counts the number of first pixels in each of the plurality of data blocks DB.

When the number of first pixels is smaller than a reference number, the image data encoding device 111 compresses the plurality of data blocks DB according to a different compression scheme. For example, the different compression scheme includes a binary encoding scheme and a differential pulse code modulation (DPCM) scheme.

Conversely, when the number of first pixels is greater than or equal to the reference number, the image data encoding device 111 generates compressed data CD, which includes position information PI regarding positions of the first pixels, and difference values DV corresponding to second pixels, in each of the plurality of data blocks DB.

Here, the 'first pixels' refer to pixels having a reference gray scale value included in each of the plurality of data blocks DB. The 'second pixels' refer to pixels having a gray scale value that is different form the reference gray scale value in each of the plurality of data blocks DB.

The image data encoding device 111 includes a data block generating unit 1111 and a compressing unit 1112.

The data block generating unit 1111 splits the image data DATA into a plurality of data blocks DB. In detail, the data block generating unit 1111 splits the image data DATA to generate a plurality of data blocks DB (e.g., data blocks DB each having a predetermined size).

The data block generating unit 1111 splits the image data DATA for each pixel group of pixels arranged continuously in a horizontal direction. The data block generating unit 1111 generates a red data block, a green data block, and a blue data block for each of the pixel groups.

For example, as illustrated in FIG. 4, each of the pixel groups may be composed of eight continuously arranged pixels (e.g., eight adjacent pixels arranged in a row). In this case, the data block generating unit 1111 generates data blocks DB_R, DB_B, DB_G1, and DB_G2 according to color. When the image data DATA is an RG-BG type data, the number of green subpixels is double the number of red subpixels, and double the number of blue subpixels. Thus, the data block generating unit 1111 generates two green data blocks (e.g., DB_G1 and DB_G2) in one pixel group.

The compressing unit 1112 compresses the plurality of data blocks DB generated by the data block generating unit 1111. In detail, the compressing unit 1112 generates compressed data CD including position information PI regarding positions of the first pixels, and difference values DV corresponding to the second pixels in each of the plurality of data blocks DB.

The reference gray scale value is a gray scale value corresponding to a last pixel of a previous pixel group, which is adjacent a current pixel group. However, a reference gray scale value of a second green data block DB_G2, among green data blocks DB_G1 and DB_G2 corresponding to one pixel group, may correspond to a last pixel 'G4' of the first green data block DB_G1.

For example, the compressing unit 1112 may generate position information Rpos with respect to the red data block DB_R as shown in Table 1 below.

TABLE 1

| Rpos | First pixels |
|---|---|
| 000 | R1, R2 |
| 001 | R1, R3 |
| 010 | R1, R4 |
| 011 | R2, R3 |
| 100 | R2, R4 |
| 101 | R3, R4 |

The compressing unit 1112 also generates position information Bpos, G1pos, and G2pos regarding the other remaining data blocks DB_B, DB_G1, and DB_G2 in a manner similar to those of Table 1. However, Table 1 simply shows an example of position information PI, and the position information PI may be set in various manners.

In case of the second pixels, the compressing unit 1112 calculates difference values DV between the second pixels and the reference gray scale value. For example, in Table 1, when Rpos is '000', the second pixels are R3 and R4. In this case, the compressing unit 1112 generates compressed data CD_R with respect to the red data block DB_R such that it includes a difference value Rd1 between the second pixel R3 and the reference gray scale value, and a difference value Rd2 between the other second pixel R4 and the reference gray scale value, together with position information Rpos with respect to the red data block DB_R.

The compressing unit 1112 also generates compressed data CD_B, CD_G1, and CD_G2 with respect to the other remaining data blocks DB_B, DB_G1, DB_G2 in the same manner as that of the compressed data CD_R with respect to the red data block DB_R.

The compressing unit 1112 includes a compression controller 1113, a position information generating unit 1114, and a subtracting unit 1115.

The compression controller 1113 counts a number of first pixels among pixels included in each of the plurality of data blocks DB. The compression controller 1113 generates a compression control signal CCS according to the counting results.

In detail, when a number of the first pixels is smaller than a reference number, the compression controller 1113 controls the compressing unit 1112 to compress each of the plurality of data blocks DB according to a different compressing method.

Conversely, when the number of the first pixels is greater than or equal to the reference number, the compression controller 1113 generates a compression control signal CCS, and supplies the generated compression control signal CCS to the position information generating unit 1114 and to the subtracting unit 1115.

In response to the compression control signal CCS, the position information generating unit 1114 generates position information PI with respect to positions of the first pixels. For example, the position information generating unit 1114 may generate position information PI according to Table 1 above.

In response to the compression control signal CCS, the subtracting unit 1115 calculates difference values DV between gray scale values of the second pixels and the reference gray scale value.

The position information PI generated by the position information generating unit 1114, and the difference values DV calculated by the subtracting unit 1115, form compressed data CD. That is, the compressed data CD includes the position information PI and the difference values DV.

For example, the compressed data CD_R with respect to the red data block DB_R includes position information Rpos with respect to the first pixels of the red data block DB_R and difference values Rd1 and Rd2 with respect to the second pixels of the red data block DB_R.

Similarly, compressed data CD_B with respect to the blue data block DB_B includes position information Bpos with respect to the first pixels of the blue data block DB_B and difference values Bd1 and Bd2 with respect to the second pixels of the blue data block DB_B. Also, each of the compressed data CD_G1 and CD_G2 with respect to the green data blocks DB_G1 and DB_G2 includes position information G1pos and G2pos with respect to the first pixels of each of the green data blocks DB_G1 and DB_G2, and the difference values G1d1, G1d2, G2d1, and G2d2 with respect to the second pixels of each of the green data blocks DB_G1 and DB_G2.

The compressed data CD is written in the memory 113. The memory 113 stores the compressed data CD supplied from the image data encoding device 111, and supplies the stored compressed data CD to the image data decoding device 115.

The image data decoding device 115 reads the compressed data CD from the memory 113, and generates image data DATA on the basis of the read compressed data CD. The process of generating the image data DATA on the basis of the compressed data CD is a reverse process of the process of compressing the image data DATA into the compressed data CD by the image data encoding device 111, so a detailed description thereof will be omitted.

The compressed data CD includes only the position information PI with respect to the first pixels, and the difference value DV with respect to the second pixels. However, the image data decoding device 115 may be able to generate gray scale values of a current pixel group by using a gray scale value corresponding to a last pixel of a previous pixel group adjacent the current pixel group, namely, a reference gray scale value.

Figure 6:
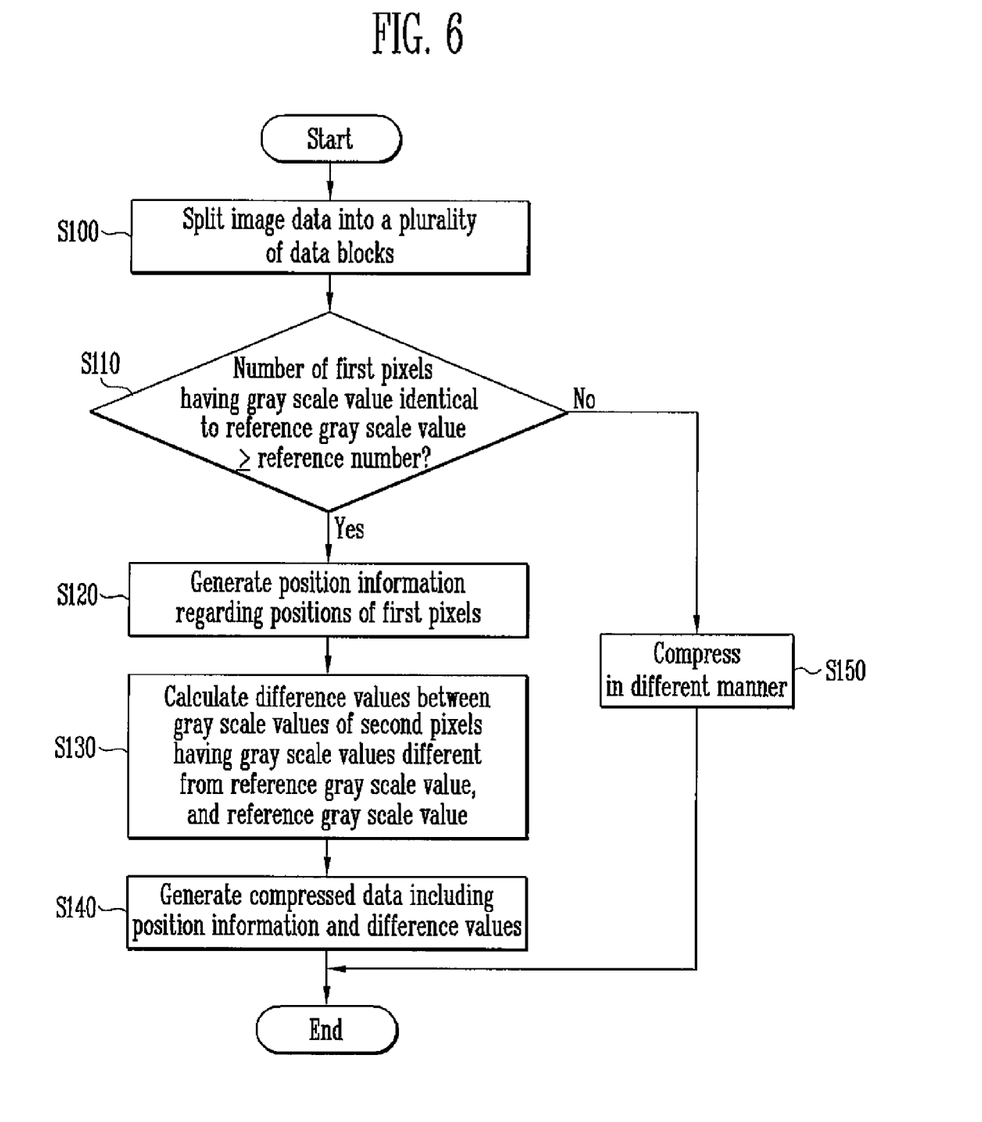
FIG. 6 is a flow chart illustrating an image data encoding method according to an embodiment of the present invention.

FIG. 6 is a flow chart illustrating an image data encoding method according to an embodiment of the present invention. Referring to FIG. 6, the image data encoding device 111 splits the image data DATA into a plurality of data blocks DB (S100). In detail, the data block generating unit 1111 of the image data encoding device 111 splits the image data DATA into a plurality of data blocks DB (S100). In further detail, the data block generating unit 1111 splits the image data DATA (e.g., splits the image data DATA to have a predetermined size) in each of pixel groups composed of continuously arranged pixels.

The image data encoding device 111 counts a number of first pixels among the pixels included in each of the plurality of data blocks CB, and compares the counted number of first pixels with a reference number (S110).

When the number of the first pixels is greater than or equal to the reference number, the image data encoding device 111 generates position information PI regarding positions of the first pixels with respect to each of the plurality of data blocks DB (S120). In detail, the position information generating unit 1114 generates the position information PI as shown in Table 1 above.

Also, the image data encoding device 111 calculates difference values DV between gray scale values of the second pixels and a reference gray scale value (S130). In detail, the subtracting unit 1115 generates the difference values DV by subtracting the reference gray scale value from the gray scale values of the second pixels.

The image data encoding device 111 writes compressed data CD including the position information PI and the difference values DV in the memory 113 (S140).

Conversely, when the number of the first pixels is smaller than the reference number, the image data encoding device 111 compresses the plurality of data blocks DB according to a different compression scheme, for example, a binary encoding scheme and a DPCM scheme (S150).

By way of summation and review, the image data encoding device and method according to embodiments of the present invention may increase a compression rate of image data.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the following claims and their equivalents.

What is claimed is:

1. An image data encoding device comprising:
    a data block generating unit configured to split image data into a plurality of data blocks; and
    a compressing unit configured to generate compressed data with respect to each of the plurality of data blocks in accordance with a number of first pixels,
    wherein, when the number of the first pixels is counted to be greater than or equal to a reference number, the compressing unit generates the compressed data comprising:
        position information regarding positions of the first pixels each having a gray scale value equal to a reference gray scale value; and
        difference values between the reference gray scale value and gray scale values of second pixels, which are different from the reference gray scale value, and
    wherein, when the number of the first pixels is less than the reference number, the compressing unit generates the compressed data compressed according to a different compression scheme than when the number of first pixels is counted to be greater than or equal to the reference number, and comprises information compressed using a binary encoding scheme or a differential pulse code modulation (DPCM) scheme.

2. The image data encoding device as claimed in claim 1, wherein the data block generating unit is configured to generate the plurality of data blocks by splitting the image data for each of pixel groups comprising continuously arranged pixels.

3. The image data encoding device as claimed in claim 2, wherein the data block generating unit is configured to generate a red data block, a green data block, and a blue data block for each of the pixel groups.

4. The image data encoding device as claimed in claim 2, wherein the reference gray scale value corresponds to a last pixel of a previous pixel group of the pixel groups adjacent a current pixel group of the pixel groups.

5. The image data encoding device as claimed in claim 1, wherein the data compressing unit comprises:
    a compression controller configured to generate a compression control signal when a number of the first pixels is greater than or equal to a reference number;
    a position information generating unit configured to generate the position information regarding the positions of the first pixels in response to the compression control signal; and
    a subtracting unit configured to calculate the difference values between the reference gray scale value and the gray scale values of the second pixels in response to the compression control signal.

6. The image data encoding device as claimed in claim 5, wherein the data compressing unit is configured to compress the plurality of data blocks according to a different compression scheme when a number of the first pixels is smaller than the reference number.

7. The image data encoding device as claimed in claim 6, wherein the different compression scheme comprises a binary encoding scheme and a differential pulse code modulation (DPCM) scheme.

8. An image data encoding method comprising:
    splitting image data into a plurality of data blocks;
    determining a number of first pixels having a gray scale value equal to a reference gray scale value for each of the data blocks by counting the number of the first pixels;
    when the number of the first pixels is greater than or equal to a reference number, generating position information regarding positions of the first pixels, calculating difference values between the reference gray scale value and gray scale values of second pixels, which are different from the reference gray scale value, and generating compressed data including the position information and the difference values; and
    generating compressed data according to a different compression scheme by using a binary encoding scheme or a differential pulse code modulation (DPCM) scheme when the number of the first pixels is less than the reference number.

9. The method as claimed in claim 8, wherein the splitting the image data comprises splitting the image data for pixels groups each comprising continuously arranged pixels.

10. The method as claimed in claim 9, wherein the plurality of data blocks comprises a red data block, a green data block, and a blue data block in each of the pixel groups.

11. The method as claimed in claim 8, wherein the reference gray scale value corresponds to a last pixel of a previous pixel group adjacent a current pixel group.

12. The image data encoding device as claimed in claim 1, wherein positions of two or more of the first pixels are non-consecutive.

* * * * *